United States Patent [19]

Foerster et al.

[11] 4,330,795
[45] May 18, 1982

[54] METHOD OF RECORDING TELEVISION SIGNALS

[75] Inventors: Hubert Foerster, Darmstadt-Eberstadt; Josef Sochor, Dieburg, both of Fed. Rep. of Germany

[73] Assignee: Robert Bosch GmbH, Stuttgart, Fed. Rep. of Germany

[21] Appl. No.: 181,673

[22] Filed: Aug. 27, 1980

[30] Foreign Application Priority Data

Sep. 3, 1979 [DE] Fed. Rep. of Germany ....... 2935574

[51] Int. Cl.³ ............................................. H04N 5/76
[52] U.S. Cl. ..................................... 358/127; 360/75; 360/33
[58] Field of Search .................... 358/127; 360/33, 70, 360/75, 9, 84, 37, 73

[56] References Cited

U.S. PATENT DOCUMENTS

| 3,003,025 | 10/1961 | Ginsburg | 360/70 |
| 3,157,739 | 11/1964 | Okamuro | 360/84 |
| 3,213,204 | 10/1965 | Okamura | 360/84 |
| 3,376,383 | 4/1968 | Felix | 360/84 |
| 3,402,237 | 9/1968 | De Lange | 360/37 |
| 3,535,440 | 10/1970 | Watanabe | 360/70 |
| 4,112,463 | 9/1978 | Kamin | 358/105 |
| 4,148,077 | 4/1979 | Bragos | 360/35 |

Primary Examiner—John H. Wolf
Assistant Examiner—Alan Faber
Attorney, Agent, or Firm—Frishauf, Holtz, Goodman & Woodward

[57] ABSTRACT

The invention relates to a method of recording a television signal of the kind in which the signal is recorded on a relatively slowly moving tape in a plurality of inclined tracks by a plurality of recording heads carried at the periphery of a head wheel rotating at a relatively high speed in a plane non-parallel to the direction of tape motion. The head wheel executes m complete revolutions for each n complete television pictures, where the ratio m/n is non-integral, and control signals having a frequency of 1/n of the picture frequency are recorded along a longitudinal control track by a fixed head. For recording signals according to the 625 line European standard, m is chosen to be 25 and n is chosen to be 2. For the U.S. 525 line standard, m is 21 and n is 2. In both cases 25 lines per track are recorded.

4 Claims, 8 Drawing Figures

Fig.3b-f
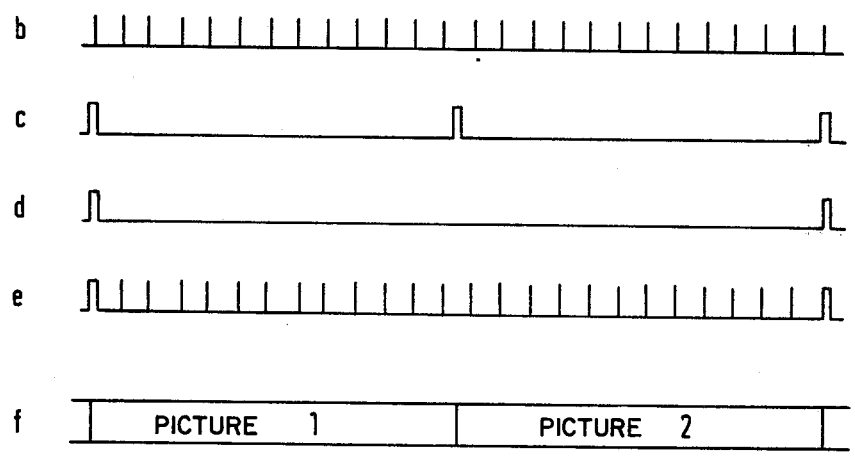

METHOD OF RECORDING TELEVISION SIGNALS

BACKGROUND TO THE INVENTION

This invention relates to a method of recording a television signal on a record carrier tape.

The broad frequency band of television signals requires a high relative speed between the tape on which the signal is recorded and the recording head which performs the recording, usually a magnetic tape and a magnetic recording head. For this reason methods of recording television signals have become known in which the signal is recorded on a relatively slowly moving magnetic tape by a scanning device having a plurality of recording and playback heads which rotate at a relatively high speed in a plane non-parallel to the direction of tape motion. The heads are carried at the periphery of a rotatable part of the scanning device which also includes guide means for guiding the tape in the correct manner past the heads. The rotatable part of the scanning device is commonly termed a head wheel in the art and the same term is used in the present description and claims, although it is to be understood that the rotatable part of the scanning device may not in face resemble a wheel but may take any suitable form.

By using such methods the signal is recorded in a plurality of substantially parallel tracks which extend at an angle to the longitudinal direction of the tape. These known methods include some in which the information content of a complete television picture is distributed among several successive tracks. Thus, for example, in the so-called cross-track recording technique, in which four heads are arranged on a head wheel perpendicular to the direction of tape motion, each track contains the information content of 16 to 17 television lines. On the other hand, in a common inclined track recording technique, in which the tape loops the scanning device in a helical manner, each track contains the information content of approximately 50 lines.

The common factor in these known methods is that after each complete television picture has been recorded a whole number of revolutions of the head wheel has taken place—in other words at the start of recording each complete television picture the head wheel occupies the same angular starting position. The reason for this is that the development of these methods was based on the desirability for each complete picture to be recorded under the same conditions as regards the distribution of the line signals among the tracks and the angular position of the head wheel.

If, however, we divide the number of lines in a complete picture—e.g. 625 lines in the European television system and 525 lines in the U.S. television system—by the number of tracks per picture which can in practice be obtained given the requirement for an integral number of revolutions of the head wheel per complete picture and taking into account practical constraints resulting from the head wheel speed and geometrical considerations (e.g. diffusion breadth, gap width, track length), then with the known methods of recording mentioned above we do not obtain a whole number of lines per track. The result of this is that the beginning of the first complete line of each track—and thus also the beginning of each further line of the track—varies from track to track relative to the edge of the tape. Since it is also advantageous to switch from one head to another within one line, there is a residue of unused area on both sides of the tape area allocated for the video tracks—in other words the tracks are one line longer than is actually necessary.

SUMMARY OF THE INVENTION

It is an object of the present invention to provide a method in which the tape area on the one hand can be more efficiently used and on the other hand complete images can be juxtaposed selectively with an electronic cutter.

Accordingly, the present invention provides in a method of recording a television signal of the kind in which the signal is recorded on a relatively slowly moving tape in a plurality of tracks extending at an angle to the longitudinal direction of the tape by a plurality of recording heads carried at the periphery of a head wheel which rotates at a relatively high speed, the improvement wherein the head wheel executes m complete revolutions for each n complete television pictures, where the ratio m/n is not an integer, and wherein control signals having a repetition frequency equal to 1/n of the complete picture frequency are recorded on a control track by a fixed recording head.

The method according to the invention has the advantage that the first complete line of every track begins at a constant position in relation to the edge of the tape. For reasons which will be explained later, this permits each track to be only as long as the number of complete lines to be recorded and reproduced therefrom, so that no unused, or redundant tape area will result at the beginning and at the end of the tracks.

In addition, the invention provides advantages in relation to the correction of faults which often occur in the scanning of signals recorded on tapes as a result of spatial variations of the tape. These faults are rectified by appropriate compensating circuits and, since the faults are dependent on the position of the signal in question in relation to the edge of the tape, they can be avoided or fairly easily rectified since the method according to the invention provides the same geometrical conditions from track to track.

In the performance of the invention, it is especially advantageous to provide 25 lines per track. In this case $12\frac{1}{2}$ revolutions of a head wheel with two heads are required for the recording of a complete picture according to the 625 line European Standard. On the other hand, for the 525 line U.S. Standard, the same head wheel makes 10.5 revolutions to record one complete picture with 25 lines per track.

BRIEF DESCRIPTION OF THE DRAWINGS

An embodiment of the invention will now be described, by way of example, with reference to the accompanying drawings, in which:

FIG. 3a is a schematic circuit arrangement shown in association with a known magnetic recording apparatus to produce a track layout according to the principles of FIG. 2, and FIGS. 3b to 3f are timing diagrams illustrating the operation of FIG. 3a.

DESCRIPTION OF THE PREFERRED EMBODIMENT

Figure 1:
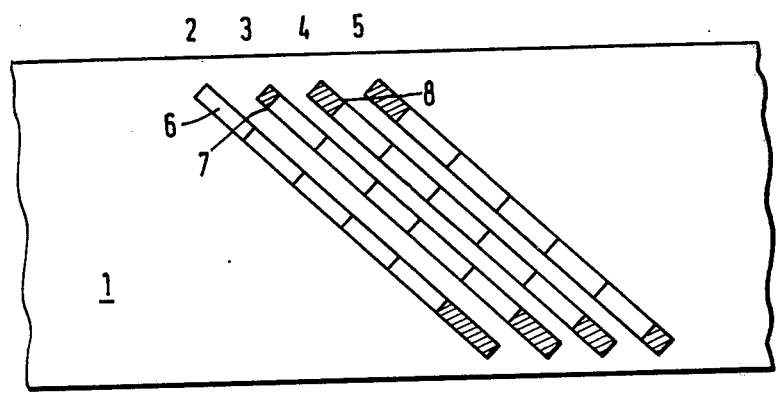
FIG. 1 is a simplified view of a portion of a magnetic tape with an inclined track layout recorded in accordance with a prior art method.

FIG. 1 is a schematic representation of the track layout produced according to a known method of recording television signals. For simplification fewer lines per track are shown than is the case in reality. On the magnetic tape 1 there are several parallel tracks 2, 3, 4, 5 extending at an angle across the tape. Track 2 is assumed to begin with a complete line 6. However, since the division of the number of lines in a complete picture (for example 625) by the number of tracks produced by the corresponding integral number of revolutions of the head wheel does not in conventional apparatus result in a whole number, the beginning of the first complete line varies from one track to another. Thus, for example, the first complete line does not begin on track 3 until the point marked 7, and in the case of track 4, until the point marked 8.

In one known method operating according to the principles of FIG. 1, six revolutions of the head wheel per complete television picture are provided, which means that if there are two heads on the head wheel there are twelve tracks per complete picture. Because of the positional variation in the beginning of the first complete line of each track illustrated in FIG. 1, the result in this known method is that 52 complete lines are recorded in, and upon reproduction taken from, each of the first eleven tracks, and 53 lines from the twelfth track of each complete picture. It is, therefore, necessary to provide space for 53 lines per track, since the recording may start at any random point along the tape.

This inadequacy in the use of tape area may in fact seem slight in the case of the example given, but systems are possible in which only a few lines per track are recorded, especially in the case of the digital recording of television signals, so that proportionally the unused area of the tape can be significantly greater. In addition there are the abovementioned advantages in respect of fault or error correction, for example in the correction of speed errors.

The track layout shown in FIG. 2 does not show the line displacement described in connection with FIG. 1. The first line recorded on each track invariably begins at the start of the track at a constant distance from the edge of the tape, and the length of the track corresponds only to the number of complete lines to be reproduced from the track. No overlapping of the last (incomplete) line of one track by the first (incomplete) line of the following track is necessary, although a significantly smaller overlapping may be provided to allow for possible tolerances.

Figure 2:
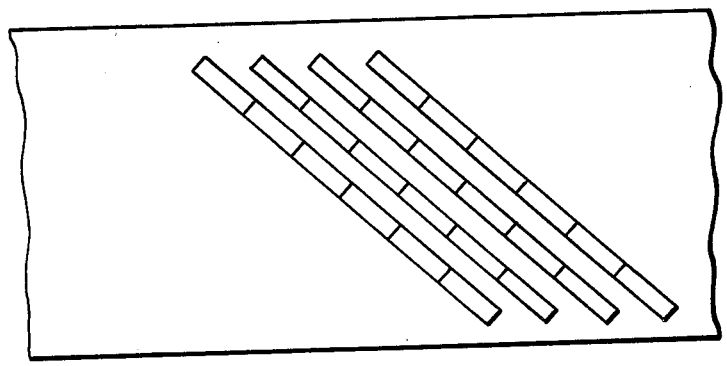
FIG. 2 is a similar view showing the track layout produced according to an embodiment of the invention.
Figure 3A:
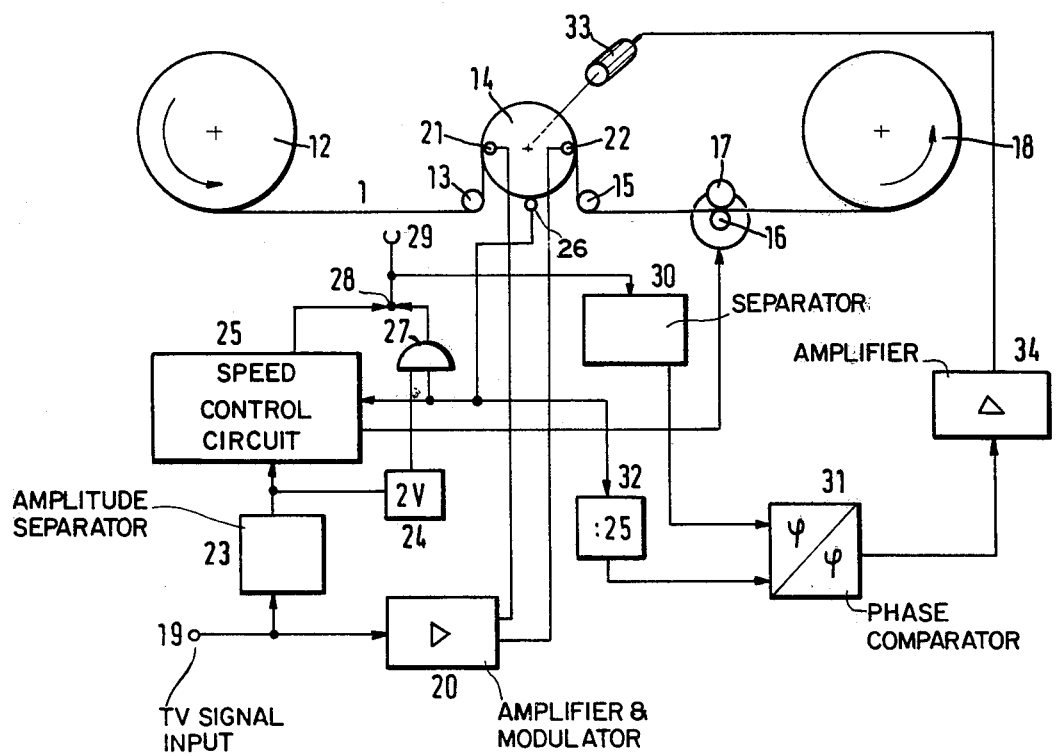

FIG. 3a illustrates a tape recording and playback machine arranged to provide a track layout according to the principles of FIG. 2. The figure shows only the parts of the machine necessary for the understanding of the present embodiment of the invention, since inclined track tape recording and reproducing machines are well known in the art and details thereof are not considered necessary for inclusion in the present specification.

The magnetic tape 1 is fed from a storage spool 12, around an idler 13, around a scanning device of which for the sake of clarity only the head wheel 14 is shown, around a further idler 15, past a tape drive capstan 16 against which the tape is pressed by a pressure roller 17, to a take-up spool 18.

A 19 a television signal to be recorded is fed in and passes via known amplifiers and modulators 20 to a pair of diametrically opposite magnetic recording/playback heads 21 and 22 carried at the periphery of the head wheel 14. The signal is also fed to a known amplitude separator 23 wherein the synchronisation signals are separated. In circuit 24 a 2V pulse is derived which occurs at the beginning of every complete television picture. This type of circuit is already known, see for example German AS No. 26 13 706 to which U.S. Pat. No. 4,112,463 corresponds.

The rotational speed of the head wheel 14, driven by a motor 33 and also that of the tape drive capstan 16 are controlled during recording by means of a control circuit 25 to which the synchronising signals from the amplitude separator 23 are applied. This control is effected in well known manner in the prior art (see, for example, U.S. Pat. No. 3,003,025) such that an integral number of head wheel revolutions are executed per complete television picture, whereby a track layout similar to that shown in FIG. 1 is produced.

In order to implement the embodiment of the method according to the invention it is necessary only to modify this control circuit slightly in such a way that the number of head wheel revolutions per complete television picture is no longer integral. In particular, it is required that the head wheel executes m complete revolutions for each n complete television pictures, where the ratio m/n is not an integer, and where m is chosen in relation to n and the number of lines in a complete television picture such that the frequency at which the tracks are recorded is an integral fraction of the line frequency of the television signal. This method of controlling the head wheel speed ensures that the first complete line recorded in each track begins at the same distance from the edge of the tape, so that each track need therefore only be as long as the number of lines to be recorded and reproduced therefrom, thus providing efficient use of the space on the tape in the lateral direction. Furthermore, by providing that the first line of each complete television picture begins substantially coincident with the start of a track, the first line of each successive track will also begin at the start of the track so that each track will only contain complete lines.

Having chosen a suitable value for m according to the above criteria it is a relatively simple matter to modify the control circuitry 25 to provide the necessary nonintegral relationship, and the skilled worker in the art will have no difficulty in modifying the control circuitry 25 for this purpose. It is therefore not thought necessary to provide the details of such modifications in the present specification. However, in the description which follows it is assumed that m=25 and n=2, these being suitable values for the 625 line European Standard. For the U.S. 525 line standard the values would be m=21 and n=2. In each case 25 lines per track would be recorded using two heads 21, 22 as has assumed to be the case.

In addition to controlling the recording of the inclined tracks in the manner described above, the control circuit 25 also provides control signals having a frequency equal to the rotational frequency of the head wheel and which are recorded on a longitudinal control track of the tape by a fixed magnetic head 29. These control signals are derived from head wheel pulses produced one per revolution of the head wheel in known manner by a transducer 26 disposed adjacent the head wheel 14. These head wheel pulses, shown schematically in FIG. 3b, are also fed to one input of an AND gate 27. The 2V pulses (FIG. 3c) from the circuit 24 are fed to the other input of this AND gate 27, so that the output pulses of the AND gate 27, shown in FIG. 3d, occur at one half of the complete picture frequency, that is, at one quarter of the vertical frequency. These latter pulses (referred to below as 4V pulses) are superposed at 28 on the control pulses supplied by the control circuit 25, so that the composite control signal mixture recorded by the magnetic head 29 is shown at FIG. 3e. The 4V pulses are used in controlling the speed of the head wheel during reproduction, as will be described.

The result of the embodiment of the method according to the invention described above is that on the tape the recording of each two consecutive complete pictures (in FIG. 3f designated Picture 1 and Picture 2) differ in that one picturebeginsin coincidence wtih a 4V pulse and the other does not; in other words the respective first tracks of successive complete television pictures are recorded by alternate ones of the two magnetic heads 21 and 22. While this difference has effects on the control within the machine during playback, for example it is necessary during playback to connect the correct head at the proper time with the playback-amplifier, it is not however noticeable when interconnecting the recording and playback machine with other picture sources, especially when joining together various recordings which are reproduced from various machines, since the reproduced television signals themselves are the same from image to image, apart from possible alterations of the image content.

During playback of the television signal recorded in accordance with the method described in relation to FIG. 3, the tape drive capstan 16 is driven under the control of the control circuit 25, at the speed required for reproduction of the recorded signal at the correct rate. The magnetic pick-up head 29 reads out the recorded control signal mixture shown in FIG. 3e from the control track. This control signal mixture is fed into a circuit 30 which extracts the 4V pulses shown in FIG. 3d from this mixture. The 4V pulses are fed to a phase comparison circuit 31 and compared with the phase position of pulses which are derived by frequency division of the head wheel pulses provided by the transducer 26. In the case of the present embodiment in which head wheel 14 executes 25 revolutions for each two complete television pictures, it is necessary to divide by 25 using the division circuit 32. The output signal of the phase comparison circuit 31 is fed after appropriate amplification in an amplifier 34 to control the motor 33 to drive the head wheel 14 in proper phase.

We claim:

1. In a method of recording a television signal in which the television signal is recorded on a relatively slowly moving tape (1) in a plurality of tracks extending at an angle to the longitudinal direction of the tape by a plurality of recording heads (21, 22) carried at the periphery of a head wheel (14) which rotates at a relatively high speed, the improvement comprising the steps of controlling rotation of the head wheel to execute m complete revolutions for each n complete television pictures, wherein the ratio m/n is not an integer;

and recording control signals having a repetition frequency equal to 1/n of the complete picture frequency on a control track by a fixed recording head (29).

2. A method as claimed in claim 1, wherein each complete television picture comprises 625 lines and the head wheel executes 12.5 revolutions for each complete picture, and wherein the repetition frequency of the control signals is equal to half of the complete picture frequency.

3. A method as claimed in claim 1, wherein each complete television picture comprises 525 lines and the head wheel executes 10.5 revolutions for each complete picture, and wherein the repetition frequency of the control signals is equal to half of the complete picture frequency.

4. A method as claimed in claim 1, including the step of recording further signals on the control track which are derived as a function of the angular position of the head wheel.

* * * * *